Patented Oct. 26, 1926.

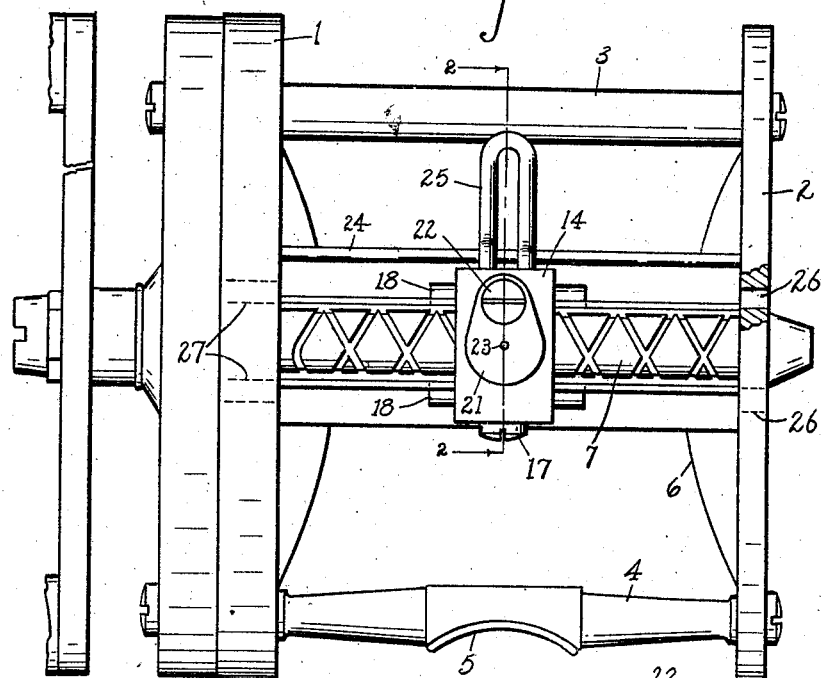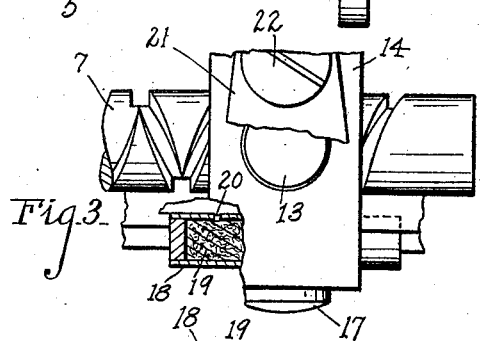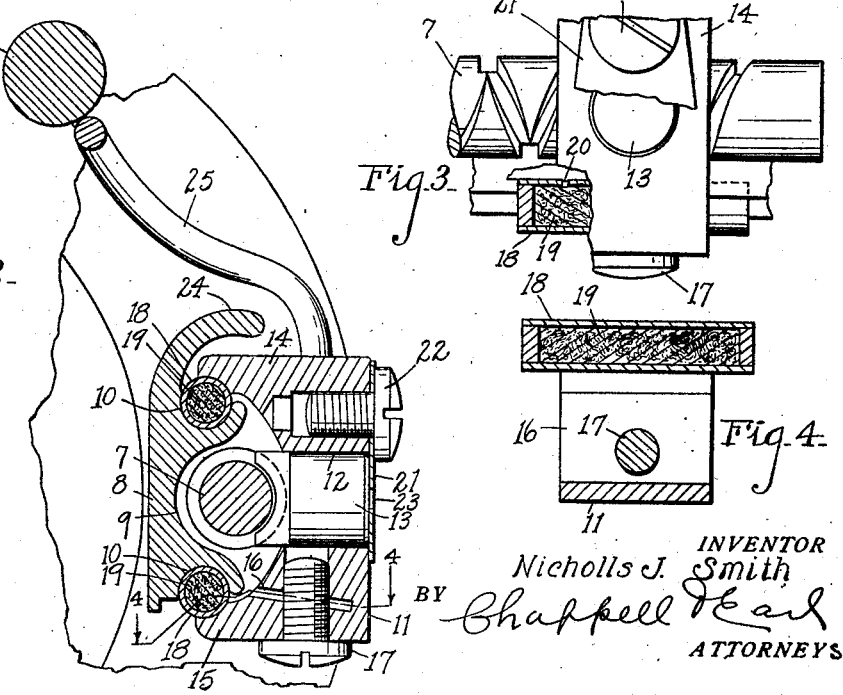

1,604,666

UNITED STATES PATENT OFFICE.

NICHOLLS J. SMITH, OF BAINBRIDGE, GEORGIA.

FISHING REEL.

Application filed November 19, 1925. Serial No. 70,043.

The main objects of these improvements are:

First, to provide an improved fishing reel of the level wind type in which the line guide carriage is supported for free sliding movement independently of the line traversing shaft and so that its bearings are not likely to bind.

Second, to provide an improved fishing reel of the class described in which the bearing parts may be conveniently adjusted in assembling or to compensate for wear.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a front view of my improved fishing reel, one of the head members of the frame being broken away to show structural details.

Fig. 2 is an enlarged detail section on a line corresponding to line 2—2 of Fig. 1.

Fig. 3 is an enlarged fragmentary front elevation showing structural details of the carriage and its bearing members.

Fig. 4 is a detail section on a line corresponding to broken line 4—4 of Fig. 2.

Referring to the drawing, the frame of the reel in the embodiment illustrated comprises a chambered head member 1 in which the gears are housed and the plate-like head member 2, or tie plate, as it is sometimes designated. These head members are connected by the pillars 3 and 4, the pillar 4 carrying the clip plate 5 for attaching the reel to a rod. The reel is provided with the usual spool 6 and with a reversely threaded traversing shaft 7. The driving gears for the traversing shaft are not illustrated as they form no part of my invention and gear trains for the spool and traversing shaft are old in the art.

At the rear of the traversing shaft I mount an integral line guide carriage way member 8 having a longitudinal recess 9 at the front side thereof to receive the traversing shaft 7. This way member 8 has oppositely facing channel-like ways 10 disposed on opposite sides and uniformly spaced from the traversing shaft.

The line guide carriage 11 is preferably blocklike in form having a central bore 12 therein for the pawl 13 and rearwardly projecting arms 14 and 15 at opposite sides of the shaft 7. A slot 16 extends from the inner side of the carriage member partially severing the arm 15 so that it may be adjusted by means of the screw 17.

The bearing arms are provided with tubular bearings 18 which in the embodiment illustrated are filled with fibrous lubricant carrying material 19, the bearing members having holes 20 in their bearing faces into which the lubricant may pass to lubricate the ways.

The pawl is retained in its seat 12 by means of the plate 21 overlapping the bore 12 and retained by means of screws 22. This permits of the convenient removal or insertion of the pawl in assembling or for cleaning the plate 21 constituting a closure for the outer end of the bore 12, it being preferably provided with an oil hole 23.

By providing the adjustable arm 15 the carriage may be easily assembled with the oppositely facing channel-like ways and the bearings very accurately adjusted therein, both in the initial assembling and to compensate for wear as the case may require.

The way member in the embodiment illustrated is provided with a forwardly projecting guard 24 which overhangs the upper way serving as a substantial protection in preventing dirt and the like entering the same and also keeping the line out of the way. The elongated line guide eye 25 is mounted on the carriage at the front of this guard and is offset rearwardly above the same with its upper end lying below and adjacent the pillar 3. The pillar thus serves as a guard for the line guide eye preventing injury thereto. With the line guide eye offset the pull or stress of the line thereon is centered in approximately a vertical plane through the line guide carriage bearings.

The bearings are preferably longer than the carriage, as illustrated, and to accommodate the same at the ends of the stroke of the carriage, the head member 2 is provided with holes 26 alined with the ways so that the bearing members may project therethrough. The head member 1 is provided with corresponding holes 27 indicated by dotted lines. Further, any foreign matter lodging in the ways may be ejected therefrom by the reciprocation of the bearings through these openings. The elongated bearing members are an advantage in preventing the binding of the carriage in the ways. This permits the use of a narrow carriage so that the line is laid closely against the flanges of the spool.

My improvements in fishing reels are very advantageous and at the same time are simple and economical to produce. I have illustrated the same in one form which I regard as very practical. I have not attempted to illustrate or describe other embodiments or adaptations as I believe the disclosure made will enable the embodiment or adaptation of my improvements as may be desired.

Having thus described my invention what I claim as new and desire to secure by Letters Patent is:

1. In a fishing reel, the combination of a frame, a spool, a traversing shaft, an integral line guide carriage way member having a channel-like recess in the front side thereof to receive said traversing shaft and oppositely facing channel-like ways above and below said recess, said way member having an integral guard overhanging the upper way, a block-like line guide carriage member provided with a centrally disposed shaft engaging pawl and inwardly projecting bearing arms at opposite sides of the shaft, said carriage member being slotted adjacent one of the arms to permit adjustment thereof, an adjusting screw coacting with said adjustable arm, elongated bearing members on said arms coacting with said ways, and a rearwardly offset line guide eye on said carriage overhanging said way member.

2. In a fishing reel, the combination of a frame, a spool, a traversing shaft, an integral line guide carriage way member having a channel-like recess in the front side thereof to receive said traversing shaft and oppositely facing channel-like ways above and below said recess, a block-like line guide carriage member provided with a centrally disposed shaft engaging pawl and inwardly projecting bearing arms at opposite sides of the shaft, said carriage member being slotted adjacent one of the arms to permit adjustment thereof, an adjusting screw coacting with said adjustable arm, elongated bearing members on said arms coacting with said ways, and a line guide eye on said carriage.

3. In a fishing reel, the combination of a frame comprising head members and a connecting pillar, a spool, a traversing shaft, a line guide carriage provided with a centrally disposed pawl coacting with said traversing shaft, said carriage being provided with bearing arms disposed on opposite sides of said shaft provided with bearing members, one of said bearing arms being adjustable on said carriage, an adjustable screw for said adjustable arm, a way member having oppositely facing channel-like ways for said bearing members, said way member being recessed to receive said traversing shaft and having a forwardly projecting guard overhanging the upper way, and an elongated line guide eye on said carriage offset rearwardly over said guard with its upper end adjacent to and below said frame pillar.

4. In a fishing reel, the combination of a frame, a spool, a traversing shaft, an integral line guide carriage way member having a channel-like recess in the front side thereof to receive said traversing shaft and oppositely facing channel-like ways above and below said recess, a line guide carriage member provided with a centrally disposed shaft engaging pawl and inwardly projecting bearing arms at opposite sides of the shaft, elongated bearing members on said arms coacting with said ways, and a line guide eye on said carriage.

In witness whereof I have hereunto set my hand.

NICHOLLS J. SMITH.